April 17, 1951     I. J. HAMILTON     2,549,083
ROTARY DEVICE
Filed Dec. 14, 1945
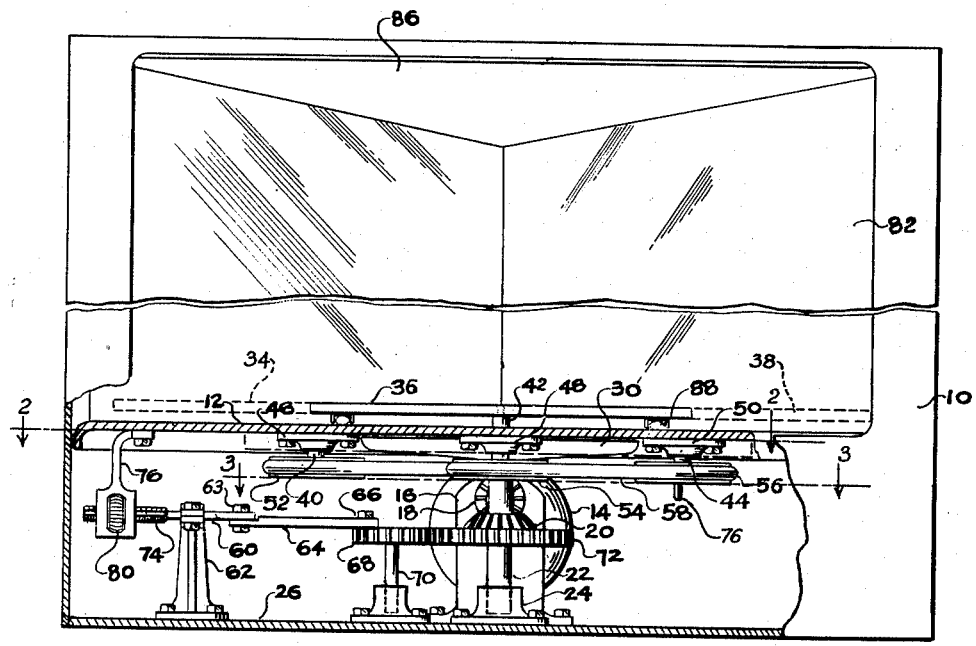
ISRAEL J. HAMILTON.
INVENTOR
BY
Mason & Graham
ATTORNEYS Patented Apr. 17, 1951

2,549,083

UNITED STATES PATENT OFFICE 2,549,083

ROTARY DEVICE

Israel J. Hamilton, Inglewood, Calif.

Application December 14, 1945, Serial No. 635,078

4 Claims. (Cl. 211—1.6)

My invention relates to means for rotating a support carrying a plurality of tables or other secondary supporting means to bring each of said latter means in succession to a desired point at which the tables or other secondary supporting means may be rotated while the rotatable support is held stationary during a predetermined length of time.

My invention will be hereinafter described with relation to a display device, but it is to be understood that the invention is not restricted to such use but has a wide range of application and the scope of the invention is not in any way limited except as indicated by the scope of the appended claims.

Display devices have been proposed which incorporate a number of supporting tables which may be rotated to display articles thereon and it has also been proposed to mount such tables on a rotatable support. Such previously proposed constructions, however, are often of relatively complicated construction and would necessitate considerable maintenance in continuous use.

It is an object of my invention to provide an attractive and effective display device incorporating novel driving means of my invention.

Another object of the invention is to provide means for rotating a plurality of tables mounted on a rotatable support by means operating to rotate the support to bring a rotatable table to a desired point at which the table is rotated during a predetermined period of time while the rotatable support is held stationary.

Another object of the invention is to provide a device of the kind referred to in which the speed of rotation of the tables mounted on the support may be individually adjusted.

A further object of the invention is to provide driving means for a device of the kind described which, although very simple, enable different speeds of rotation of the rotatable support to be obtained, as well as of the time during which each table is rotated.

Still further features and objects of the invention will hereinafter appear in the following description taken in conjunction with the accompanying drawings, in which:

Fig. 1 is an elevation of a display device incorporating the driving means of my invention, the device being broken through to shorten the height thereof, and parts broken away to show the arrangement of the driving mechanism;

Fig. 2 is a reduced section on line 2—2 of Fig. 1, a housing in which the device is arranged being omitted together with drive means separately shown, and partitions being indicated by dash lines;

Fig. 3 is a section on line 3—3 of Fig. 1, showing the driving means;

Fig. 4 is a detail showing the arrangement of an antifriction bearing for the rotatable support; and Fig. 5 is a detail showing one form of positive clutch mechanism which may be utilized if desired.

Referring now to Fig. 1, the numeral 10 indicates a housing in which the device is arranged. A rotatable support 12 is revolved by an electric motor 14 through reduction gear 16, arranged in the housing, and a bevel pinion on the driven shaft of the reduction gear 18 driving a bevel gear 20 on vertical shaft 22 rotatably mounted in a pedestal bearing 24 on base 26. A driving pulley 28, Fig. 2, is fixedly mounted on the upper part of the shaft 22, which preferably projects into a central bore 23 in the rotatable support 12 to center it, but is not directly connected to the rotatable support. Shaft 22 affords an antifriction bearing for the rotatable support, for instance, as shown in Fig. 4, through a bearing plate 30 secured to the top of shaft 22, and a ring of ball bearings 32 carried round the edge of the plate and bearing against the underside of the rotatable support 12.

In the embodiment of the invention illustrated, the rotatable support 12 carries three rotatable tables 34, 36, 38 rotated by shafts 40, 42, 44, respectively, which shafts project through bearings 46, 48, 50 on the rotatable support and carry driving pulleys 52, 54, 56 which are arranged to lie in the same plane as the pulley 28 driven by the motor. An endless driving belt 58 is engaged with all the driving pulleys.

Rotation of the driving pulley 28 serves to rotate the rotatable support 12 without causing rotation of the tables mounted thereon since the resistance of the rotatable support to rotation is less than the combined resistance of the rotatable tables mounted thereon, but if the rotatable support 12 is held against rotation, the rotatable tables will then be given a rotary movement.

In order to arrest rotation of the rotatable support 12 at predetermined points such, for instance, as opposite a peripheral opening 11 in the housing 10, which may be closed around the remainder of its periphery, I provide a constantly reciprocated detent 60 mounted for to and fro movement in a standard 62 secured to the base 26 of the housing. The detent is reciprocated by a link 64 pivotally connected to detent 60 by bolts 63 and pivotally and eccentrically connected, as indicated at 66 to a gear 68 mounted for rotation on a standard 70 secured to the base 26. Gear 68 is rotated by gear 72 mounted on and keyed to shaft 22 on which the bevel gear 20 is also secured.

Detent 60, in its extended position, lies in the path of adjustable stops projecting from the rotatable support. Each stop comprises a mount 76 secured to the underside of the rotatable support 12 and through which a threaded member 74 may be adjusted, to extend inwardly a greater or lesser amount, by rotation of nut 80 mounted on member 74 and working in a slot in the mount 76. It will be understood that the further the threaded member 74 projects into the path of the detent 60 the longer will be the time taken for the detent to be withdrawn from contact with the threaded member and therefore the longer will be the dwell of the rotatable support 12.

I prefer to arrange radially arranged partitions 82 mounted on the rotatable support 12 to form compartments separating the rotatable tables. As indicated in Fig. 1, the partitions 82 may be provided with mirror walls and with a downwardly and inwardly sloped mirror top 86.

The device may be constructed of any suitable size for the purpose for which it is to be used. If the tables mounted on the rotatable support are of relatively large size, I prefer to provide journalled barrel shaped bearings 88 mounted in brackets on the underside of the rotatable tables and running on the upper surface of the rotatable support.

It will be seen that the construction described provides a desirable degree of flexibility in arranging the movements of the different parts. For instance, by choosing driving pulleys of different sizes for the different tables, the speed of rotation of one table as compared to another can be varied, while changing the diameter of the driving pulley 28, or the gear ratios of the speed reducing means, will affect the speed of rotation of all the tables. The duration of the dwell of the tables at any predetermined point such as at openings in the housing may be individually adjusted by adjusting the threaded member 74, while the to and fro movement of the detent 60 may be varied by adjusting the point at which link 64 is connected to gear 68 in any suitable manner.

The described construction provides a mechanism in which acceleration of the rotatable support from arrested position is easy and relatively shockless, while stopping of the rotation of the support, since energy of the driving means is immediately transferred to effecting rotation of the tables carried on the support, also imposes little strain on the driving mechanism. If it is desired to decrease the suddenness of stopping of the rotary support, a suitable shock absorbing element may be readily incorporated in the adjustable member 74 or elsewhere in the actuating means.

It will be obvious that the use of a chain drive will maintain the relative setting of the rotatable support and tables to one another.

It may sometimes be desirable to arrange the rotatable support to start as rapidly as possible after a stop, one suitable arrangement for this purpose being shown in Fig. 5, in which although the belt or chain drive is arranged as previously described, the driving pinion 90 and driven gear 92 are arranged toward the bottom of the driving shaft 22. A clutch operating mechanism is provided comprising a crank lever 94 pivoted on a standard 95 projecting upwardly from the base of the housing. One arm 96 of lever 94 is positioned to be operable by the end of link 64, when withdrawn from engagement with the threaded member 74 of a stop, to rock lever arm 98 and lift a disk 100, mounted to slide on shaft 22, thereby raising pins 102, mounted in bores 103 in the driving pulley 28, against the resistance of springs 104, to engage in a toothed circular track 106 mounted on the underside of the rotatable support. The springs 104 are mounted in enlargements of the bores 103 and are confined between the upper end of the enlarged bore and discs 105 secured on the pins.

When the reciprocated detent 60 moves outwardly out of contact with lever arm 96 the rotatable support is free from a positive drive since pins 102 will be withdrawn by springs 104 from the toothed track 106.

As an example of the widely different uses to which my invention may be put, it might be mentioned that the device could be arranged to bring articles to be sprayed in succession to a series of spraying nozzles, the article being rotated while at that point so that all exterior surfaces are reached by the spray. Many other uses of the invention will be obvious to those skilled in the art.

I claim:

1. A rotary display device comprising a base, a rotatable support mounted for rotation relative to the base and presenting radially arranged partitions mounted on said support defining a plurality of circumferentially spaced display compartments, a driven member having supporting engagement with the rotatable support, a plurality of work supporting tables mounted for rotation with, and at times relative to, the rotatable support, one in each of the respective compartments, stop means cooperating with the rotatable support to intermittently arrest movement of the latter for predetermined periods, and means responsive to operation of the driven member for rotating the work supporting tables relative to the rotatable support when rotative movement of the latter is arrested, said stop means comprising circumferentially spaced projections on the rotatable support, a detent member mounted for reciprocatory movement into and out of the path of movement of the projections, and means operatively connected to the continuously driven shaft for reciprocating the detent member.

2. In a rotary device having a rotatable support; a plurality of tables mounted on and for rotation with, and at time for rotation relatively to, the rotatable support; a continuously rotated shaft, drive transmission mechanism constantly engaged with said continuously rotated shaft and with the tables; and a stop intermittently operated by the continuously rotated shaft and effective to intermittently arrest rotation of the rotatable support, said drive transmission mechanism being effective to rotate the rotatable support and tables together while the rotatable support is free of said stop and to rotate the tables relatively to the rotatable support while rotation of the latter is arrested by the stop.

3. In a rotary device having an intermittently rotated support, a plurality of rotatable tables mounted thereon, and driving members for the rotatable tables: a continuously rotated shaft;

a belt extending between said continuously rotated shaft and the driving members of each of the rotatable tables; and a stop intermittently operated by the means rotating the drive member to arrest rotation of said rotatable support during a predetermined period, the power transmission belt being effective when the rotatable support is free of the stop means to effect rotation of the rotatable support, carrying the rotatable tables around without rotating them, and to rotate the rotatable tables with respect to the rotatable support while rotation of the latter is arrested.

4. A rotary device comprising: a base; a rotatable support mounted on said base; a continuously rotated vertical shaft having its upper end abutting and positioning said rotatable support; a member mounted on the upper end of the shaft and freely bearing against the rotatable support; a plurality of tables mounted for rotation on, and relative to, the rotatable support; means continuously engaged with said vertical shaft and the tables for rotating the latter with the rotatable support when said support is free to rotate, and rotating the tables relative to the rotatable support when the latter is prevented from rotating; stop projections circumferentially spaced on the rotatable support; a detent member mounted for movement into and out of the path of movement of the projections; and means operated by the continuously rotated vertical shaft for moving the detent member alternately into engagement with a projection to arrest rotation of the rotatable support and out of engagement with a projection to free the support for a rotational movement.

ISRAEL J. HAMILTON.

REFERENCES CITED

The following references are of record in the file of this patent:

UNITED STATES PATENTS

| Number | Name | Date |
|---|---|---|
| 1,208,457 | Bellville | Dec. 12, 1916 |
| 1,254,983 | Chadwick | Jan. 29, 1918 |
| 1,479,618 | Mansbendel | Jan. 1, 1924 |
| 1,611,155 | Bisaillon | Dec. 21, 1926 |
| 1,653,394 | De Vries | Dec. 20, 1927 |
| 1,656,527 | Messinger et al. | Jan. 17, 1928 |
| 1,885,801 | Chester | Nov. 1, 1932 |
| 2,116,127 | Steiert | May 3, 1938 |
| 2,117,882 | Going | May 17, 1938 |